(12) United States Patent
Shinkoda et al.

(10) Patent No.: US 6,443,571 B1
(45) Date of Patent: Sep. 3, 2002

(54) SELF-REGISTERING FLUID DROPLET TRANSFER METHOD

(75) Inventors: Ichiro Shinkoda; Daniel Gelbart, both of Vancouver (CA)

(73) Assignee: Creo Srl, Holetown (BB)

( * ) Notice: Subject to any disclaimer, the term of this patent is extended or adjusted under 35 U.S.C. 154(b) by 8 days.

(21) Appl. No.: 09/631,710

(22) Filed: Aug. 3, 2000

(51) Int. Cl.$^7$ .................................................. B41J 2/01
(52) U.S. Cl. ....................................................... 347/103
(58) Field of Search .......................... 347/103, 55, 151, 347/120, 20, 141, 154, 123, 111, 159, 127, 128, 131, 125, 158, 40, 12; 399/271, 290, 292, 293, 294, 295

(56) References Cited

U.S. PATENT DOCUMENTS

| | | |
|---|---|---|
| 4,054,882 A | 10/1977 | Ruscitto |
| 4,219,822 A | 8/1980 | Paranjpe |
| 4,232,324 A | 11/1980 | Tsao |
| 4,272,771 A | 6/1981 | Furukawa |
| 4,293,866 A | 10/1981 | Takita |
| 4,525,721 A | 6/1985 | Crean |
| 4,538,156 A | 8/1985 | Durkee |
| 4,673,303 A | 6/1987 | Sansone |
| 4,809,016 A | 2/1989 | Padalino |
| 5,070,345 A | 12/1991 | Lahut |
| 5,099,256 A | 3/1992 | Anderson |
| 5,124,720 A | 6/1992 | Schantz |
| 5,398,053 A | 3/1995 | Hirosawa |
| 5,796,418 A | 8/1998 | Silverbrook |

*Primary Examiner*—Raquel Yvette Gordon
(74) *Attorney, Agent, or Firm*—Oyen Wiggs Green & Mutala

(57) ABSTRACT

An inkjet printing method corrects for droplet placement errors. The method comprises fluid droplets self-registering on a patterned transferring surface that ensures that they are transferred to the correct pixel positions on the final printing surface. The invention also allows for the characteristics of the droplets to be changed while on the patterned surface. The properties may include, but need not be limited to, the size of the droplets, their viscosity and their more general rheological properties. For some applications, there is merit in the droplets changing their water solubility.

28 Claims, 3 Drawing Sheets

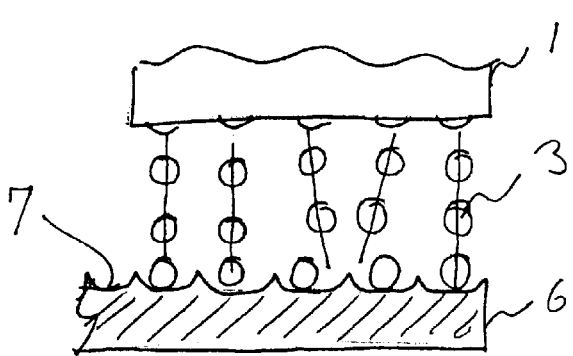 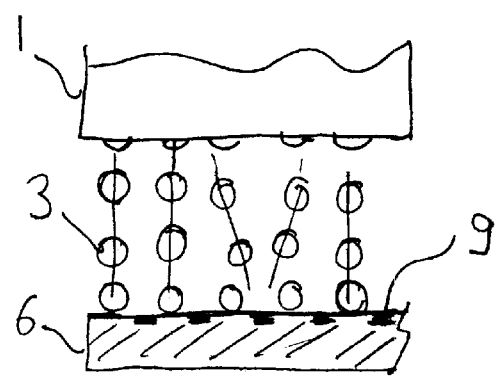
Fig 3-a          Fig 3-b

SELF-REGISTERING FLUID DROPLET TRANSFER METHOD

BACKGROUND OF THE INVENTION

Inkjet printing has been a major technology for bringing affordable color printing to the market. While there is a considerable variation in the products on offer and the specific technology employed, the basic method remains that of expelling a small droplet of ink-bearing liquid from a miniature nozzle onto the surface of the medium being printed on. Each droplet represents a pixel to be printed. A row or array of such nozzles is then scanned across the print page in order to address each pixel position by a wide range of interlacing and interleaving schemes. An electronic control unit directs the scanning process and sends the instructions to individual nozzles as to whether they should print at a given position or time. The method by which the droplets are expelled varies, as do the inks.

One of the most enduring shortcomings of the inkjet process has been the fact that the resulting print shows banding or striations. These may be traced back to one of three factors. Firstly, the lateral registration of the printing head, as it traverses laterally across the page in order to address all the columns being printed, may be less than perfect. Secondly, failed or clogged nozzles in the printing array head may cause missing or intermittent lines that are reproduced across the width of the page. Thirdly, droplets being emitted in either inconsistent trajectories or off-center lead to similar banding.

The first problem has been addressed via a variety of print head designs or interleaving printing arrangements driven by appropriate software. This includes page wide print head arrays. Examples of print head array designs addressing this issue are Furukawa in U.S. Pat. No. 4,272,771, Tsao in U.S. Pat. No. 4,232,324, Padalino in U.S. Pat. No. 4,809,016 and Lahut in U.S. Pat. No. 5,070,345.

The second problem has been addressed via various backup and redundancy schemes. Examples of such methods and head designs are given by Schantz in U.S. Pat. No. 5,124,720, Hirosawa in U.S. Pat. No. 5,398,053 and Silverbrook in U.S. Pat. No. 5,796,418.

The present invention addresses itself to the third issue, namely that of the ink droplets finally ending up on the print medium in a misaligned position. This issue has dogged the industry for some years now and is rather more fundamental to the basic process of inks expelled through a nozzle. Various techniques have been proposed and employed to address it.

One method of which variants are often proposed is that of using electrostatic fields to direct the droplet. Examples of this approach are given by Ruscitto in U.S. Pat. No. 4,054,882, Paranjpe in U.S. Pat. No. 4,219,822 and Crean U.S. Pat. No. 4,525,721.

One approach that has been followed in addressing the quality of inkjet printing is to introduce a roller between the nozzles and the final surface on which the printing is to take place. This offset roller approach is described in a number of inventions. Examples are given by Takita in U.S. Pat. No. 4,293,866 and Durkee in U.S. Pat. No. 4,538,156.

When an ink-bearing droplet is expelled from a nozzle onto a substrate surface the droplet will deform when it hits the surface and finally comes to rest. Depending on the particular combination of liquid and materials used for the solid surface, it will assume a spheroid shape of which the distortion away from a perfect sphere is determined by the surface energy of the substrate and the surface tension of the liquid of which the droplet is composed. All it requires is a single monolayer of surface material in order to change the behavior of a surface between hydrophilic and hydrophobic.

If, in particular, the substrate were hydrophobic, and the droplet were water-based, the droplet would tend more towards a perfect sphere than if the substrate were hydrophilic and wetted by water. A consequence of this particular former combination of substrate and ink is that the droplet would not adhere to the substrate very well for the very same reasons that caused it to be a near-perfect sphere. With the low attractive force between substrate and the droplet, there would then also be a much greater likelihood of independent neighboring drops coalescing.

This situation is of particular relevance to inkjet printing. In this technology a multiplicity of droplets is deposited and, depending on whether one is printing solid and shadow areas on the one hand, or highlighted areas on the other, the droplets may be very close together or far apart. If it is indeed solids and shadows to be printed, then there is a high likelihood of the droplets coalescing due to mutual proximity. The image being reproduced will therefore lose its integrity under these circumstances.

If the substrate surface were chosen to be hydrophilic, and the ink were water-based, then the droplet would deform considerably away from a sphere. Such a surface is said to be "wet" by water. The droplet would now much be more likely to adhere to the surface. Some prior art discusses a transfer via an intermediate roller, similar to offset printing.

In order to transfer the droplets to a final surface, such as paper, the droplets should however, not adhere too strongly to the intermediate surface otherwise droplets will partially remain on the transfer surface and transfer will be degraded.

While located on the transfer surface the droplets may ideally be made to undergo such change in their properties as will make them exhibit superior printing characteristics with respect to the final print surface. Finally, when printed, the droplets should absent themselves totally from the transfer surface and be committed totally to the final print surface, maintaining their registry in the process.

In a number of applications there is merit to the ink droplets being reduced in viscosity or in physical size while located on the transfer surface. This assists in avoiding the printed dot developing a misshapen form as the solvent spreads into the printing surface and assists in maintaining the color intensity and correctness of the reproduction and helps control dot gain. There are also applications in which it is useful to manage the ink in a water-based format for the purposes of ejection through a nozzle, but where it is more useful for the ink to change to non-water -soluble for the final transfer to the printing surface.

Sansone in U.S. Pat. No. 4,673,303 and Anderson in U.S. Pat. No. 5,099,256 describe apparatus that allow for the modification of the ink droplets while in residence on a transfer surface. None of this particular prior art addresses the problem of banding or striations. The transfer roller in the prior art improves the dot shape, but not the accuracy of the positioning of the dot. It is the object of the present invention to improve the dot positioning accuracy while incorporating all the advantages of the prior art.

BRIEF SUMMARY OF THE INVENTION

An inkjet printing method corrects for local error in position of droplets deposited by an inkjet nozzle. The method comprises inkjet droplets self-registering on a transferring surface that ensures that they are transferred to the correct pixel positions on the final printing surface.

BRIEF DESCRIPTION OF THE DRAWINGS

FIGS. 3A and FIG. 3B show two embodiments of the droplet self-registering transfer method.

DETAILED DESCRIPTION OF THE PREFERRED EMBODIMENT

Figure 1:
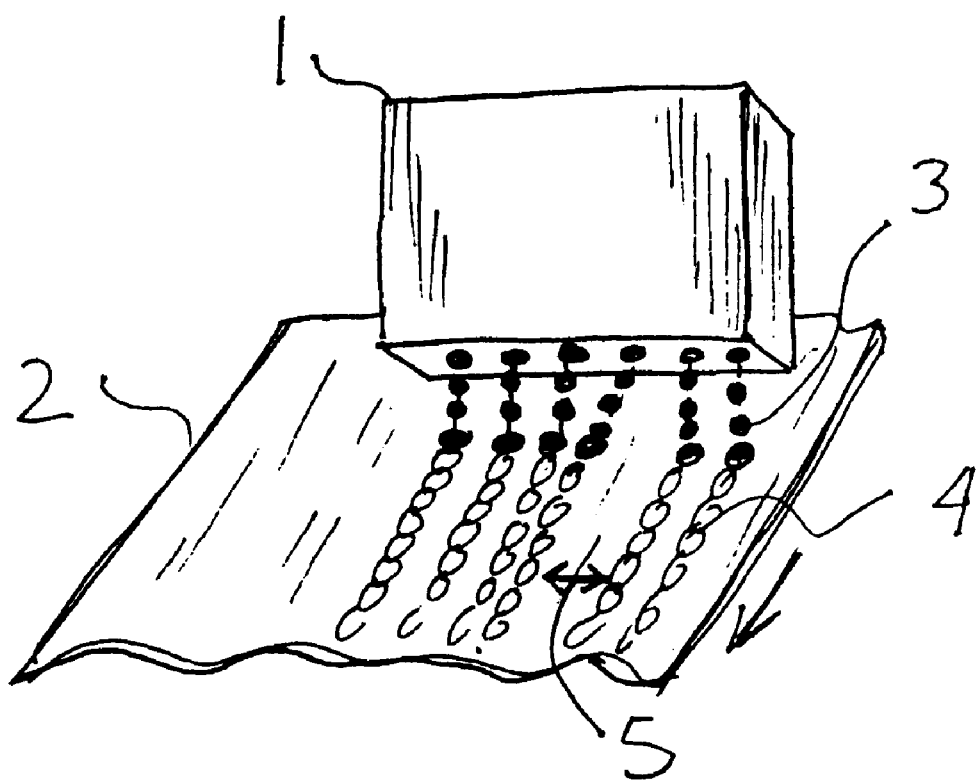
FIG. 1 depicts the source of striping or banding in inkjet printers.

FIG. 1 illustrates the essence of the striping and banding phenomenon in inkjet printing in terms of an inkjet head 1 printing on a printing surface 2. The inkjet head 1 comprises an array of inkjet nozzles, arranged in the figure as a one-dimensional array for the sake of clarity. In an industrial implementation the array will more typically be two-dimensional and may be interlaced. It may also scan across the printing surface 2 by any variety of interleaving mechanisms. Any given nozzle on ink jet head 1 generates, through the repeated emission of ink droplets 3, a track 4 of printed dots on the printing surface 2.

The design of the inkjet head is such that it presumes a fixed and equal spacing 5 between tracks. However, due to nozzles being misaligned or the emission from them being impeded in some or other way, they may emit their ink at an angle other than totally vertical. This leads to the formation of striping or banding on the printed surface.

Figure 2:
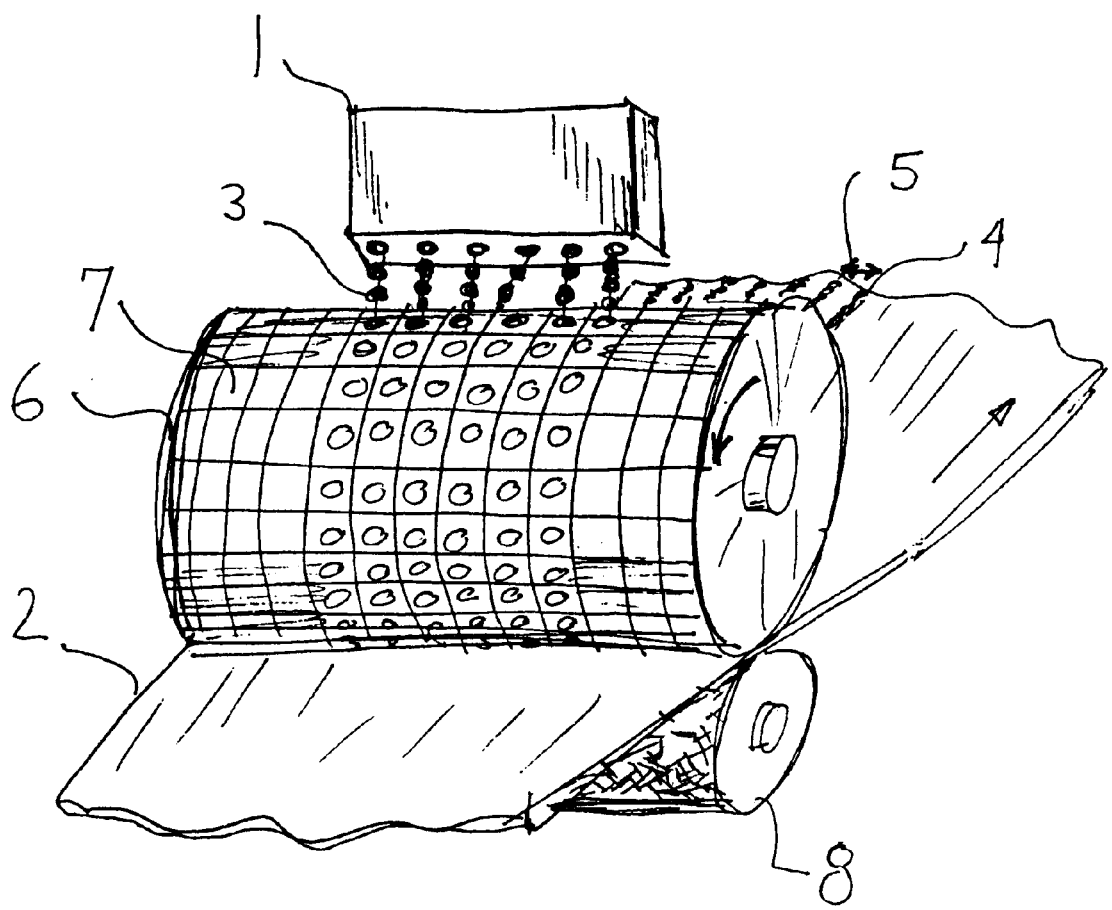
FIG. 2 shows the functioning of a droplet-centering transfer drum roller.

FIG. 2 illustrates the same inkjet head 1 as in FIG. 1 now used to deposit the ink droplets 3 on a drum roller 6 of which the surface has been modified to cause the droplets to self-center on locations with surface characteristics described below in more detail in FIG. 3A and FIG. 3B. As before, the inkjet head 1 has the purpose of causing dots to be printed onto printing surface 2 via a series of ink droplets 3 to ultimately create tracks 4 with spacing 5. Drum roller 6 with periodic cell pattern 7 collects the droplets that center themselves on the cells. In printing various different screening methods may be employed, including stochastic. It is, however, necessary in the present invention for the cell pattern on the drum roller 6 to have periodicity. While this periodicity need, in principle, to be only in the lateral dimension parallel to the inkjet nozzles, it will more practically be two-dimensional such that the droplets are centered also in the forward scanning direction of the inkjet head.

The emission of ink droplets is synchronized with the rotation of the drum roller to ensure that droplets are emitted coincident with the passing of a row of cells underneath the nozzles. As is the standard practice in the industry, drum roller 7 rolls the paper against an elastomeric roller 8. In this manner the droplets may be emitted off-center to a significant degree, but will have their positions automatically corrected by the cell structure on the drum roller. The drum roller then transfers the droplets to the printing medium with the dots correctly positioned despite the off-center emission from some nozzles.

FIG. 3A depicts a first embodiment of the cell structure of the drum roller and elucidates the functioning of the self-registration mechanism. The surface of the roller drum 6 consists of a hydrophobic material such as TEFLON™ or a silicone or the surface may be treated with a silicone or a fluorocarbon to achieve a hydrophobic state. This surface is textured into regular depression cells 7 as shown in the figure, the cell pitch coinciding with the dot pitch as obtained from the inkjet head 1. As a specific example, in a printer with a 600 dot per inch resolution the separation between centers of cells on the drum roller surface will be $\frac{1}{600}$ of an inch in both directions. The cell walls are approximately $\frac{1}{2400}$ of an inch (10 microns) in width and from 0 to 0.001 of an inch (0 to 25 microns) in height.

An example of a commercial product that can be used to create such a texturing is PEARLDRY™ manufactured by Presstek. The plate can be written with any desired pattern. Rollers such as that described above are well known in the art where they are known as Anilox rollers and are used to distribute ink in flexographic printing. In an Anilox roller the ink covers the whole area rather than being deposited image-wise on the roller. An existing Anilox roller can be made hydrophobic by a silicone or fluorocarbon coating. Also a variety of CVD/PVD technologies produce hydrophobic coatings as, for example, used on lenses for spectacles.

The purpose of the pattern is to generate a grid of minimum energy points based on a varying combination of surface energy and surface tension across a cell. In FIG. 3A it is predominantly the surface tension of the water-based droplets that ensures that the droplets will locate themselves on the centers of the cells. The fact that the surface is inherently hydrophobic in this embodiment ensures that the droplets will transfer well to another surface if placed in contact with it. Thus, when the drum roller revolves and places the cell-centered droplets in contact with the ultimate printing surface, the droplets will transfer to that surface, but their positions will now have been automatically corrected from their initial varying centering as emitted from the original inkjet head nozzles.

FIG. 3B depicts a further embodiment of the invention. In this case, the surface of the drum roller is not mechanically patterned, but smooth, and it is rendered semi-hydrophobic. This may be achieved by fabricating the drum such that the surface is metal, glass or ceramic. A mesh pattern of highly hydrophobic material such as silicone or fluorocarbon is committed to this surface. This results in the surface having a grid or mesh that is highly hydrophobic with patch cells of semi-hydrophobic material forming distinctly separated island cells that are fluid droplet retentive. The surface will function just as in the previous embodiment with the droplets residing on, and centering themselves on, the semi-hydrophobic cells. The advantage of this embodiment is that it is a mechanically smooth and may be cleaned with greater ease.

Again, as the drum roller rotates, the droplets, correctly centered on their cells, are brought into contact with the ultimate printing surface 2.

In a third embodiment a combination of the previous two approaches is followed. Here the mechanically shaped surface of the first embodiment is made hydrophobic and is augmented with a more hydrophilic coating in the troughs of the cells. In this embodiment surface tension of the droplets combines with surface energy of the cell troughs to ensure that the water-based ink droplets will locate themselves automatically on the troughs in the center of the cells. As in the first two embodiments, the automatically centered droplets are printed in correct registry on the printing surface 2.

The invention lends itself to the control of interleaved printing in that the roller may be used to ensure that ink droplets deposited on a first scan, nowhere touch other droplets deposited during the same scan. This may be achieved by nowhere printing adjacent dots on any given scan. This removes the possibility of droplets coalescing due to proximity. Any further droplets required to address spaces in between those printed in the first pass, may be printed as required on a second scan.

It is also possible to address the matter of redundancy in that more than one inkjet nozzle may be addressed to deposit and ink droplet in the same cell on the transfer drum. The use of the drum still allows a wide variety of interleaving schemes to be applied as long as they all address the same basic cell structure on the drum.

It is also possible to implement the invention in just the lateral dimension. In such a case, the drum will have grooves rather than cells and the ink droplets will be confined laterally but not longitudinally to the direction of roller motion.

The relationship between the spacing of inkjet nozzles and the cell period on the drum does not have to be 1-to-1. These two parameters may be integer multiples of each other. In the case where the nozzle spacing is a multiple of the cell period, the inkjet head may be translated laterally to ensure that droplets are deposited in each cell, thereby ensuring that the final printed image has the full resolution of the transfer drum cell pattern.

In the case where the cell period is an integer multiple of the of the inkjet nozzle spacing, it will be possible to have redundancy of nozzles per cell on the drum surface. This may be applied to situations where some nozzles have become blocked and the adjacent one may be used to deposit the ink droplet in the same cell.

Although there are fewer oleophobic than hydrophobic candidate materials available industrially, the same principle of operation may be applied using these materials. For example, a silicone-coated roller will repel droplets of oil-based ink and cause them to register (i.e. self-center) to the grid of the roller. This is important when ultra-violet-cured inks are used, as many ultra-violet types of ink are not water-based.

The invention also allows for the characteristics of the droplets to be changed while on the patterned surface. The properties may include, but need not be limited to, the size of the droplets, their viscosity and their more general rheological properties. For some applications, there is merit in the droplets changing their water solubility.

While the invention has here been described in detail as applied to a printing application, it is equally applicable to the deposition of other materials in liquid form for other applications. Examples are the manufacture of printed circuit boards and semiconductor wafer processing via the use of photolithographic materials such as photo-resists and other resins. The same holds true for the field of stereolithography where 3-dimensional models are constructed from resin by various means using photosensitive resins. The same principle of locally corrected deposition could be used to deposit resin in liquid form. The method may be applied to a wide range of substrate materials such as paper, polymers, glass, metal, ceramic and printing plates.

What is claimed is:

1. A method for the image-wise transfer of fluid droplets from at least one fluid droplet source onto a substrate, said method comprising:

a) ejecting said fluid droplets from said at least one fluid droplet source onto a transferring surface, said transferring surface incorporating a periodic pattern in at least one dimension and b) transferring said fluid droplets located on said transferring surface by placing said transferring surface in contact with said substrate.

2. A method as in claim 1 wherein said periodic pattern modifies the spatial registration of said fluid droplets.

3. A method as in claim 1 wherein the at least one fluid droplet source comprises a plurality of fluid droplet sources spaced apart from one another by a separation and wherein there is an integer relationship between the period of said periodic pattern and the separation of said droplet sources.

4. A method as in claim 2 wherein said periodic pattern comprises fluid droplet retentive locations on an otherwise less fluid droplet retentive surface.

5. A method as in claim 4 wherein said fluid is water-based and said fluid droplet retentive locations on said transferring surface are less hydrophobic than the rest of said transferring surface.

6. A method as in claim 4 wherein said fluid is water-based and said fluid droplet retentive locations are depressions in a hydrophobic surface.

7. A method as in claim 4 wherein said fluid is oil-based and said fluid droplet retentive locations on said transferring surface are less oleophobic than the rest of said transferring surface.

8. A method as in claim 4 wherein said ink is oil-based and said fluid droplet retentive locations are depressions in an oleophobic surface.

9. A method as in claim 1 wherein the characteristics of said fluid droplets are changed while said fluid droplets are located on said transferring surface.

10. A method as in claim 9 wherein said change is a reduction in size.

11. A method as in claim 10 wherein said reduction in size is induced by heating.

12. A method as in claim 9 wherein the rheological properties of said fluid droplets are changed while said fluid droplets are on said transferring surface.

13. A method as in claim 12 wherein said change in rheological properties is induced by heat.

14. A method as in claim 12 wherein said change in rheological properties is induced by electromagnetic radiation.

15. A method as in claim 9 wherein the water-solubility of said fluid droplets is changed while said fluid droplets are located on said transfer surface.

16. A method as in claim 12 wherein the viscosity of said fluid droplets is changed while said fluid droplets are located on said transfer surface.

17. A method as in any of claims 1 to 16 wherein the substrate is any of the following: paper, polymeric, glass, metal, ceramic, a printed circuit board, a semiconductor, a printing plate.

18. A method as in any of claims 1 to 16 wherein said at least one fluid droplet source comprises an inkjet printer head.

19. A method as in any of claims 1 to 16 wherein said transferring surface is the surface of a drum roller.

20. A method as in any of claims 1 to 16 wherein said fluid incorporates a colorant.

21. A method as in any of claims 1 to 16 wherein the fluid is one of the following: ink, resin, photo-resist, and thermal resist.

22. A method for the image-wise transfer of fluid droplets from a plurality of spaced-apart fluid droplet sources onto a substrate, the method comprising:

ejecting fluid droplets from said fluid droplet sources onto a transferring surface, said transferring surface incorporating a periodic pattern of fluid-droplet-retentive locations in at least one dimension and transferring the fluid droplets from the transferring surface to the substrate by bringing the droplets on the transferring surface into contact with the substrate.

23. The method of claim 22 wherein the transferring surface comprises a surface of a drum roller and the periodic pattern is periodic in a lateral dimension.

24. The method of claim 23 wherein the periodic pattern is periodic in a forward scanning direction and the method comprises synchronizing emission of the fluid droplets with rotation of the drum roller.

25. The method of claim 24 wherein bringing the droplets on the transferring surface into contact with the substrate comprises rolling the substrate between the drum roller and another roller.

26. The method of claim 23 wherein bringing the droplets on the transferring surface into contact with the substrate comprises rolling the substrate between the drum roller and another roller.

27. The method of claim 23 wherein the spaced-apart fluid droplet sources are spaced apart from one another in the lateral dimension by a spacing and there is an integer relationship between the spacing and a period of the periodic pattern in the material dimension.

28. The method of any one of claims 22 to 27 wherein the fluid droplet sources comprise inkjet printer nozzles, the fluid droplets comprise droplets of ink and the substrate comprises a sheet-like printing medium.

* * * * *